No. 758,687. Patented May 3, 1904.

UNITED STATES PATENT OFFICE.

ALEXANDER S. RAMAGE, OF CLEVELAND, OHIO.

PIGMENT AND METHOD OF PRODUCING IT FROM FERROUS LIQUORS.

SPECIFICATION forming part of Letters Patent No. 758,687, dated May 3, 1904.

Application filed May 27, 1903. Serial No. 159,022. (No specimens.)

*To all whom it may concern:*

Be it known that I, ALEXANDER S. RAMAGE, a citizen of the United States, residing at Cleveland, in the county of Cuyahoga and State of Ohio, have invented certain new and useful Improvements in Pigments and Method of Producing Them from Ferrous Liquors, of which the following is a specification.

In Letters Patent No. 691,324, granted to me January 14, 1902, I have described and claimed a light-yellow basic ferric oxid and a method of producing it from ferrous liquors. The pigment of this patent is characterized by its unusual capacity for absorbing oil, which is three times as great as that of ochers. While this property is one which gives the pigment unusual value for many purposes, a pigment is frequently required with a lower absorptive power for oil, especially in the manufacture of paste goods. The present invention is concerned with the production of a pigment similar in color and other valuable properties to that of my previous patent, but having an oil-absorptive power which is lower and which can be regulated as desired by suitably varying the conditions of manufacture.

The production of the basic ferric hydrate from ferrous-sulfate liquors is determined by the presence of a sufficient volume of water to hydrolize the basic ferric sulfate produced by diffusing air through the liquor. I have now found that if a concentrated ferrous-sulfate solution be employed having a density of at least 15° Baumé the product obtained by oxidizing it by the injection of air or air and steam is a basic sulfate having a brilliant-yellow color like that of the hydrate, but of much greater specific gravity. The oil-absorptive power of this basic sulfate is very low and unfits it for many uses.

The present invention specifically relates to the production of a composite pigment consisting of particles of the yellow basic sulfate of low oil-absorptive power mixed, impregnated, or coated with the basic hydrate of high oil-absorptive power, the proportion of the sulfate and hydrate being variable and dependent on the amount of oil which it is desirable that the finished product should absorb.

In carrying out the process a ferrous liquor, such as the waste solution resulting from the pickling of iron and containing ferrous sulfate having a density of at least 15° Baumé, is employed. If the liquor contains any free acid, it is desirable to neutralize it, as by adding sodium carbonate. The ferrous-sulfate solution is then oxidized by injecting streams of air or air and steam through it, and the iron is precipitated as a bright-yellow basic sulfate having the formula $Fe_2O_3,Fe_2(SO_4)_3$. It is desirable to maintain the liquor in a neutral condition during the operation, as by adding a hydrate or a carbonate of an alkali or an alkaline-earth metal from time to time. The liquor is now diluted by the addition of water to a point where the basic sulfate is hydrolized as formed, the injection of air or air and steam being continued and the acid set free being neutralized as required. The conditions during this second stage of the process are those of my patent heretofore referred to. Basic ferric hydrate having the formula $Fe_2O_3,Fe_2(OH)_6$ is thus precipitated upon the particles of basic ferric sulfate thrown down in the first stage of the process. The residual liquor is then filtered off from the pigment, which is collected and dried. This composite pigment may be calcined and gives brilliant scarlet reds of the desired oil-absorptive power in a very fine state of subdivision. When steam is blown through the ferrous liquor together with air, the dilution of the liquor to the point which determines the precipitation of the hydrate rather than the sulfate may be effected by the water so added, provided the original concentration of the liquor is not too great. The time of completion of the first stage of the process may easily be tested by drawing samples from the treating-tank. The basic sulfate, as stated, is much heavier than the basic hydrate, and if the suspended matter in the sample quickly settles it indicates that the precipitation of sulfate is still going on. If, however, the sample remains a turbid yellow, it is evident that the dilution has proceeded to a point where the hydrate rather than the sulfate is precipitating.

The composite pigment may be produced by separately precipitating the basic sulfate and basic hydrate and then mechanically mixing the two precipitates. Such product, however, is inferior to the one produced by successively throwing down the sulfate and hydrate from the same liquor in that the mixture is not sufficiently intimate, whereas in the product of the preferred method the hydrate is precipitated on the surface of the particles of sulfate.

I claim—

1. The method of producing pigments from ferrous-sulfate liquors, which consists in precipitating from the liquor predetermined amounts of basic ferric sulfate and basic ferric hydrate, and combining said sulfate and hydrate precipitates, as set forth.

2. The method of producing pigments from ferrous-sulfate liquors, which consists in precipitating from the liquor predetermined amounts of basic ferric sulfate and basic ferric hydrate, combining said sulfate and hydrate precipitates, and drying and calcining the pigment, as set forth.

3. The method of producing pigments from ferrous-sulfate liquors, which consists in first precipitating a basic ferric sulfate, and then precipitating upon said sulfate a basic ferric hydrate, as set forth.

4. The method of producing pigments from ferrous-sulfate liquors, which consists in first precipitating a basic ferric sulfate, then precipitating upon said sulfate a basic ferric hydrate, and drying and calcining the pigment, as set forth.

5. The method of producing pigments from ferrous-sulfate liquors, which consists in first oxidizing a strong liquor under such conditions that basic ferric sulfate is precipitated, then diluting the liquor, and finally oxidizing it under such conditions that a basic ferric hydrate is precipitated upon the sulfate precipitate.

6. The method of producing pigments from ferrous-sulfate liquors, which consists in first oxidizing a strong liquor under such conditions that basic ferric sulfate is precipitated, then diluting the liquor, oxidizing it under such conditions that a basic ferric hydrate is precipitated upon the sulfate precipitate, and drying and calcining the pigment, as set forth.

7. The method of producing pigments from ferrous-sulfate liquors, which consists in first blowing the concentrated liquor with air, thereby precipitating basic ferric sulfate, then diluting the liquor, and finally blowing the dilute liquor with air, thereby precipitating basic ferric hydrate upon the sulfate precipitate, as set forth.

8. The method of producing pigments from ferrous-sulfate liquors, which consists in first blowing the concentrated liquor with air and neutralizing the acid set free, thereby precipitating basic ferric sulfate, then diluting the liquor, and finally blowing the dilute liquor with air and neutralizing the acid set free, thereby precipitating basic ferric hydrate upon the sulfate precipitate, as set forth.

9. A composite pigment, consisting of a mixture of basic ferric sulfate, having the formula $Fe_2O_3, Fe_2(SO_4)_3$, and a basic ferric hydrate, having the formula $Fe_2O_3, Fe_2(OH)_6$, the same being of a golden-yellow color, fine and velvety to the touch, and having an oil-absorptive power dependent upon the relative percentages of the sulfate and hydrate, as set forth.

10. A composite pigment, consisting of particles of basic ferric sulfate, having the formula $Fe_2O_3, Fe_2(SO_4)_3$, impregnated or coated with basic ferric hydrate, having the formula $Fe_2O_3, Fe_2(OH)_6$, as set forth.

In testimony whereof I affix my signature in presence of two witnesses.

ALEXANDER S. RAMAGE.

Witnesses:
ROB. C. LEES HAMILTON,
A. E. GILBERT.